United States Patent
Alt et al.

(10) Patent No.: US 10,268,216 B2
(45) Date of Patent: Apr. 23, 2019

(54) METHOD AND SYSTEM FOR PROVIDING POSITION OR MOVEMENT INFORMATION FOR CONTROLLING AT LEAST ONE FUNCTION OF AN ENVIRONMENT

(71) Applicant: Apple Inc., Cupertino, CA (US)

(72) Inventors: Thomas Alt, Pullach Im Isartal (DE); Lejing Wang, Munich (DE)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 15/093,607

(22) Filed: Apr. 7, 2016

(65) Prior Publication Data
US 2016/0225163 A1 Aug. 4, 2016

Related U.S. Application Data

(63) Continuation-in-part of application No. PCT/EP2013/070819, filed on Oct. 7, 2013.

(30) Foreign Application Priority Data

Oct. 7, 2013 (WO) .................. PCT/EP2013/070819

(51) Int. Cl.
*G05D 23/00* (2006.01)
*G05D 25/02* (2006.01)
(Continued)

(52) U.S. Cl.
CPC .............. *G05D 23/00* (2013.01); *G05D 25/02* (2013.01); *G06F 3/165* (2013.01); *G06T 7/246* (2017.01);
(Continued)

(58) Field of Classification Search
CPC ..... G06T 7/2093; G06T 7/292; G06T 19/006; G06T 7/80; G06T 2207/30244;
(Continued)

(56) References Cited

U.S. PATENT DOCUMENTS 8,532,675 B1 9/2013 Pasquero
RE45,980 E * 4/2016 Ohnishi .................. G08C 17/00
(Continued)

FOREIGN PATENT DOCUMENTS

CN 101128794 A 2/2008
CN 101868967 A 10/2010
(Continued)

OTHER PUBLICATIONS

Seung-Tak Noh et al., "Lighty: A painting interface for room illumination by robotic light array," IEEE International Symposium on Mixed and Augmented Reality (ISMAR), Nov. 5, 2012 (Nov. 5, 2012), pp. 305-306, XP032309092, DOI: 10.1109/ISMAR.2012.6402586, ISBN: 978-1-4673-4660-3.

*Primary Examiner* — Jingge Wu
(74) *Attorney, Agent, or Firm* — Blank Rome LLP (57) ABSTRACT

A method for providing position information for controlling at least one function of an environment provided with an environment coordinate system comprises the steps of receiving image information associated with at least one image of at least one part of the environment captured by a camera of a mobile device, the mobile device being separate from the environment, determining a position associated with the mobile device in the environment coordinate system according to the image information associated with the at least one image, and providing position information indicative of the position associated with the mobile device in the environment coordinate system to control at least one function of the environment according to the position. There is also provided a method and system which provides movement information indicative of a movement associated with the mobile device relative to the environment coordinate system to control at least one function of the environment according to the movement.

13 Claims, 3 Drawing Sheets

US 10,268,216 B2
Page 2

(51) Int. Cl.
*G06F 3/16* (2006.01)
*G06T 7/73* (2017.01)
*G06T 7/246* (2017.01)
*G06T 7/292* (2017.01)

(52) U.S. Cl.
CPC ............... *G06T 7/292* (2017.01); *G06T 7/73* (2017.01); *G06T 2207/10004* (2013.01); *G06T 2207/10016* (2013.01); *G06T 2207/30241* (2013.01); *G06T 2207/30244* (2013.01); *G06T 2207/30268* (2013.01)

(58) Field of Classification Search
CPC .. G06T 7/70; G06T 7/73; G06T 7/246; G05D 23/00; G06F 3/1454; G06F 3/1462
See application file for complete search history.

(56) References Cited

U.S. PATENT DOCUMENTS

| | | | |
|---|---|---|---|
| 2006/0079294 A1 | 4/2006 | Chen | |
| 2006/0106504 A1* | 5/2006 | Carpenter | G08G 1/017 701/1 |
| 2008/0036586 A1* | 2/2008 | Ohki | G01C 21/362 340/539.13 |
| 2010/0100310 A1* | 4/2010 | Eich | G01C 21/3661 701/533 |
| 2010/0250369 A1* | 9/2010 | Peterson | G06F 17/30241 705/14.58 |
| 2010/0271260 A1* | 10/2010 | Guo | G01S 19/34 342/357.74 |
| 2011/0021211 A1* | 1/2011 | Ohki | G01C 21/362 455/456.3 |
| 2011/0145108 A1* | 6/2011 | Birch | G06F 17/30277 705/27.2 |
| 2011/0262002 A1 | 10/2011 | Lee | |
| 2012/0019674 A1* | 1/2012 | Ohnishi | G08C 17/00 348/207.1 |
| 2012/0065814 A1* | 3/2012 | Seok | B60K 35/00 701/2 |
| 2012/0287287 A1 | 11/2012 | Grossmann | |
| 2013/0023342 A1 | 1/2013 | Jung | |
| 2013/0247117 A1* | 9/2013 | Yamada | G08C 17/02 725/93 |
| 2013/0331027 A1* | 12/2013 | Rose | H04W 12/06 455/41.1 |
| 2014/0313334 A1* | 10/2014 | Slotky | H04N 5/23222 348/148 |
| 2015/0248762 A1* | 9/2015 | Li | G06T 7/0042 382/203 |
| 2015/0249821 A1* | 9/2015 | Tanizumi | B60R 1/00 348/46 |
| 2015/0341754 A1* | 11/2015 | Gooch | H04W 4/04 455/456.3 |
| 2016/0154408 A1* | 6/2016 | Eade | G09B 29/007 701/523 |
| 2016/0165795 A1* | 6/2016 | Balutis | G05D 1/0265 701/25 |
| 2016/0205721 A1* | 7/2016 | Sanghamitra | H04W 84/18 702/150 |

FOREIGN PATENT DOCUMENTS

| | | |
|---|---|---|
| CN | 102109922 A | 6/2011 |
| CN | 102193624 A | 9/2011 |
| CN | 102301738 A | 12/2011 |
| CN | 202169907 U | 3/2012 |
| CN | 102874250 A | 1/2013 |
| CN | 103076949 A | 5/2013 |
| JP | 2002087184 A | 3/2002 |
| JP | 2008182321 A | 8/2008 |
| JP | 2012529691 A | 11/2012 |
| JP | 2013117379 A | 6/2013 |
| WO | 2011075226 A1 | 6/2011 |
| WO | 2012113686 A1 | 8/2012 |

\* cited by examiner

METHOD AND SYSTEM FOR PROVIDING POSITION OR MOVEMENT INFORMATION FOR CONTROLLING AT LEAST ONE FUNCTION OF AN ENVIRONMENT

BACKGROUND

Self-calibration of camera positions relative to a ground plane for a camera attached to an environment is known. Obtaining information about an occupying item in an environment is also known. For example, images of an area in the environment in which the occupying item may be situated and employs a trained neural network to classify the item in the images. However, what is needed is to mount the display device to an environment and to control a function of the environment based thereon.

SUMMARY

It is an object of the invention to provide a method and system which enables a user to provide information which is appropriate for controlling at least one function of an environment based on a position or movement.

According to a first aspect, there is provided a method for providing position information for controlling at least one function of an environment provided with an environment coordinate system, the method comprising receiving image information associated with at least one image of at least one part of the environment captured by a camera of a mobile device, the mobile device being separate from the environment, determining a position associated with the mobile device in the environment coordinate system according to the image information associated with the at least one image, and providing position information indicative of the position associated with the mobile device in the environment coordinate system to control at least one function of the environment according to the position.

The invention can advantageously make use of the fact that modern environments often comprise, e.g., a display device mounted inside the environment at a known position relative to the environment and toward drivers and/or passengers sitting in the environment, and that a personal mobile device, such as a mobile phone or tablet computer, often comprises a camera.

According to the present invention, at least one function of an environment may be controlled based on a determined position associated with a mobile device comprising a camera, which position is determined by using the camera to capture at least one image of a part of the environment. For example, the captured part of the environment includes a visual content displayed on a display device mounted to the environment. In this way, the invention provides a method and system which enables a user to determine a position inside an environment for controlling at least one function of the environment based on the determined position. For example, a function of a sound system, a lighting system and/or an air conditioning of the environment may be controlled according to the position of the mobile device.

To this end, according to an embodiment, the invention proposes to determine a position of a mobile device in a coordinate system of an environment by using, for example, a display device mounted to the environment, a camera of the mobile device, and images of visual contents displayed on the display device captured by the camera of the mobile device. Furthermore, at least one function of the environment is controlled based on the determined position. For example, the function is related to a sub-system of the environment, such as a sound system, an ambient light system, an air conditioning system, or their combination.

According to an embodiment, the method further comprises providing or receiving a position of the at least one part of the environment in the environment coordinate system.

According to an embodiment, the at least one part of the environment comprises a visual content displayed on a display device mounted to the environment.

According to an embodiment, determining the position associated with the mobile device in the environment coordinate system comprises determining a camera position of the camera relative to the at least one part of the environment when capturing the at least one image according to the image information associated with the at least one image, and determining the position associated with the mobile device in the environment coordinate system according to the camera position and the position of the at least one part of the environment in the environment coordinate system.

According to a further embodiment, the at least one image is a first image and the camera is a first camera, and determining the position associated with the mobile device in the environment coordinate system comprises receiving image information associated with a second image of the at least one part of the environment captured by a second camera of the mobile device, and reconstructing a model of the at least one part of the environment according to the image information associated with the first and second images.

In a further development, the method further comprises receiving image information associated with a third image captured by a third camera of the mobile device, wherein the third image captures at least a part of the environment represented by at least part of the reconstructed model (this at least a part of the environment could be different from the at least one part of the environment mentioned above; however, the at least a part of the environment is included in the reconstructed model), determining a camera position of the third camera relative to the reconstructed model when capturing the third image according to the at least part of the reconstructed model and image information associated with the third image, and determining the position associated with the mobile device in the environment coordinate system according to the camera position of the third camera.

According to an embodiment, the method further comprises determining a camera position of the first camera relative to the at least one part of the environment when capturing the first image according to at least part of the image information associated with the first image, and determining a camera position of the second camera relative to the at least one part of the environment when capturing the second image according to at least part of the image information associated with the second image.

According to a further development, the at least one part of the environment is a first part of the environment, and the method further comprises receiving image information associated with a fourth image captured by a fourth camera of the mobile device, wherein the fourth image captures at least part of the first part of the environment and at least a second part of the environment, and extending the reconstructed model to include the first part of the environment and the second part of the environment.

Preferably, the reconstructed model at least describes depth information of at least part of the environment.

According to an embodiment, at least two of the first camera, the second camera, the third camera, and the fourth camera are the same camera.

According to another embodiment, at least two of the first camera, the second camera, the third camera, and the fourth camera are different cameras.

According to an embodiment, the at least one function is a function which is related to at least one of a sound system of the environment, an ambient light system of the environment, and an air conditioning system of the environment, and which is controlled according to the position.

According to the first aspect, there is also provided a system for providing position information for controlling at least one function of an environment provided with an environment coordinate system, the system comprising a first processing device configured to receive image information associated with at least one image of at least one part of the environment captured by a camera of a mobile device, the mobile device being separate from the environment, the first processing device configured to determine a position associated with the mobile device in the environment coordinate system according to the image information associated with the at least one image, and a second processing device configured to provide position information indicative of the position associated with the mobile device in the environment coordinate system to control at least one function of the environment according to the position.

According to a second aspect, there is provided a system for providing movement information for controlling at least one function of an environment provided with an environment coordinate system, comprising a first processing device configured to receive image information associated with at least two images captured by at least one camera of a mobile device, the mobile device being separate from the environment, and each of the at least two images capturing at least one part of the environment, the first processing device configured to determine a movement associated with the mobile device relative to the environment coordinate system according to the image information associated with the at least two images, and a second processing device configured to provide movement information indicative of the movement associated with the mobile device relative to the environment coordinate system to control at least one function of the environment according to the movement.

The following embodiments as well as other embodiments described herein are equivalently applicable in connection with, both, the first and second aspect.

According to an embodiment, the first processing device and the second processing device are the same processing device.

According to an embodiment, at least one of the first and second processing devices is comprised in the mobile device. According to another embodiment, at least one of the first and second processing devices is comprised in the environment. According to a further embodiment, at least one of the first and second processing devices is comprised in a computer device which communicates with the mobile device and the environment.

According to the second aspect, there is also provided a method for providing movement information for controlling at least one function of an environment provided with an environment coordinate system, the method comprising receiving image information associated with at least two images captured by at least one camera of a mobile device, the mobile device being separate from the environment, each of the at least two images capturing at least one part of the environment, determining a movement associated with the mobile device relative to the environment coordinate system according to the image information associated with the at least two images, and providing movement information indicative of the movement associated with the mobile device relative to the environment coordinate system to control at least one function of the environment according to the movement.

According to an embodiment, the movement associated with the mobile device relative to the environment coordinate system can be determined according to two positions associated with the mobile device in the environment coordinate system. The two positions associated with the mobile device can be determined according to the image information associated with the at least two images respectively. The at least one part of the environment captured in the each of the at least two images may have common parts or be different.

According to a further embodiment, the movement associated with the mobile device relative to the environment coordinate system can be determined according to two camera positions of the at least one camera while capturing the at least two images.

Aspects and embodiments of the invention described above or in the following with respect to the first aspect related to determining positions associated with the mobile device can equivalently also be applied to the second aspect related to determining a movement associated with the mobile device.

According to an embodiment, the movement associated with the mobile device relative to the environment coordinate system can be determined according to image positions of the at least one part of the environment captured in the each of the at least two images. This requires that the at least one part of the environment captured in the each of the at least two images are same or have common parts. However, this does not require known positions of the at least one part of the environment in the environment coordinate system.

According to the present invention, at least one function of an environment may be controlled based on a determined movement associated with a mobile device. For example, a function of a sound system, a lighting system and/or an air conditioning of the environment may be controlled according to the movement of the mobile device. The movement may be used to change volume of the sound system. The lighting system may change a current illuminated position to a new illuminated position according to the determined movement of the mobile device. For example, the determined movement may define how far away from the current illuminated position to the new illuminated position. In another example, the determined movement may define a rotation such that the lighting system may rotate from a current illuminating direction to a new illuminating direction according to the rotation.

Preferably, the mobile device is a hand held device, such as a mobile phone, a tablet computer or a mobile computer.

For example, the at least one part of the environment has a position in the environment coordinate system which could be provided by the manufacturer of the environment.

The at least one part of the environment captured in an image could be any physical part of the environment. The at least one part of the environment may include a display device mounted to the environment or a part of the display device. The at least one part of the environment may further include one or more visual contents displayed on the display device.

The display device is a device for visually presenting of information. The display device could be based on any displaying technologies or materials, such as Cathode ray tube (CRT), Light-emitting diode display (LED) and Liquid crystal display (LCD). The display device may include a 2-dimensional planar display or a display having a curved shape. The display device may also be a foldable display device comprising multiple planar sub-displays, each of which could be moved with others.

The display device may be mounted to the environment. It is preferred to be mounted towards eyes of drivers and/or passengers sitting in the environment, such that the drivers and/or passengers could see visual contents displayed on the display device. For example, the display device may be mounted on a front control panel of the environment, or mounted on a back of a front seat of the environment.

The display device could be used to display menus, maps, graphical user interfaces of software programs, etc.

The visual content is any visually perceivable information to anatomical eyes or optical imaging devices. For example, the visual content may emit or reflect visible light that could be captured by human eyes or cameras. The visual content may also emit or reflect invisible light that could be not captured by human eyes, but could be captured by a camera. The visual content could be a text, a figure, an image generated by computers or captured by cameras, a symbol, a drawing, their combinations, or a part of each of them. For example, the visual content may be a menu, a button, an icon, a digital map, a graphical user interface of a software program, their combinations, or a part of each of them. The visual content can be displayed on the display device.

The mobile device is portable and comprises one or more cameras. The one or more cameras may have known positions relative to the mobile device. The mobile device could only be a camera. For example, the mobile device is any of the camera, the first camera, the second camera, the third camera, and/or the fourth camera, i.e. the mobile device and the respective camera are the same device.

In one embodiment, the mobile device may have at least one processing device, such as a computing processor. In another embodiment, the mobile device may not have a computing processor, but may have a transmitter to transmit data (e.g. image data of images captured by the camera) to another device (e.g. the environment). The mobile device could be, but is not limited to, a mobile phone, a tablet computer, or a laptop. The camera may be separate from the mobile device, but communicate with the mobile device via a cable or wirelessly.

The one or more cameras are optical imaging devices that could capture imagery information of optical information.

The proposed invention can be applied with any camera providing images. It is not restricted to cameras providing color images in the RGB format. It can also be applied to any other color format and also to monochrome images, for example, to cameras providing images in grayscale format. The camera may further provide an image with depth data. The depth data does not need to be provided in the same resolution as the (color/grayscale) image. A camera providing an image with depth data is often called RGB-D camera. A RGB-D camera system could be a time of flight (TOF) camera system. The camera may also capture light that is invisible to human eye, such as infrared light. For example, the camera may be a thermal imaging camera.

A position of a camera in the environment coordinate system may include translations, or rotations, or their combination, in the environment coordinate system.

A visual appearance of the displayed visual content describes shape, texture, geometry or their combinations. The visual appearance may or may not include color information.

A physical geometry of an object describes size, shape, dimension, planarity, or their combinations of the object as it is in the real world.

A resolution of the display device is the number of distinct pixels in each dimension that can be displayed on its display area. The display device may have a known resolution. The display device may further have a known physical geometry for its display area. The physical geometry of the display device refers to the physical geometry of the display area of the display device. Having the pixel position of the displayed visual content in a coordinate system of the display device, and the resolution and the physical geometry of the display device, a spatial relationship between the displayed visual content and the display device can be determined. This defines a position of the displayed visual content relative to the display device. Further, a physical geometry of the displayed visual content can also be determined. The position of the displayed visual content in the environment coordinate system may be determined according to the position of the displayed visual content relative to the display device and a position of the display device relative to the environment coordinate system.

A camera position of the camera relative to the at least part of the environment while the first image is captured by the first camera can be determined according to at least part of the image. Having a physical geometry of the at least part of the environment, various vision based camera position estimation methods, such as based on 2D-3D point correspondences (see, e.g., Hartley, Richard, and Andrew Zisserman. Multiple view geometry in computer vision. Vol. 2. Cambridge, 2000), can be employed to determine the camera position.

Particularly, it is preferred to have the at least part of the environment to include a displayed visual content. The image of the camera thus captures the displayed visual content. The visual content could provide rich texture and features (e.g. contrasting corners or edges), which will make vision based camera position estimations robust. In this example, the camera position of the camera can be determined relative to the display device mounted to the environment. A position of the display device relative to the environment coordinate system could be provided from the environment manufacturer, for example.

Having the known visual appearance of the displayed visual content and its physical geometry, a camera position of the camera relative to the visual content can be determined with a correct scale factor according to at least part of the image information of the first image. Camera position estimation could be based on correspondences between image features of the captured image and corresponding features of the visual content displayed on the display device. The camera position in the environment coordinate system is then determined according to the camera position relative to the displayed visual content and the position of the displayed visual content in the environment coordinate system.

The camera position of the camera in the environment coordinate system while the camera captures the image can be determined from the camera position relative to the at least one part of the environment and the position of the at least one part of the environment in the environment coordinate system.

In one example, the position of the camera in the environment coordinate system could determine the position that can be provided to the environment to control the at least one function of the environment. The position associated with the mobile device may be the same as the position of the camera in the environment coordinate system. The position associated with the mobile device may have a displacement in space from the position of the camera in the environment coordinate system.

In another example, the position of the camera in the environment coordinate system may not be appropriate to specify the position associated with the mobile device. For example, the position of the camera may not be a desired position to be provided to the environment to control the at least one function.

According to an embodiment, the present invention proposes to further capture a second image of the at least one part of the environment by a second camera of the mobile device (with the previously described camera and image being a first camera and first image, respectively). The second image and the first image are captured when the second camera and the first camera are at different positions.

A camera position of the second camera relative to the at least one part of the environment while the second image is captured may be determined according to the at least part of the second image. The disclosed method of determining the camera position of the first camera may also be used to determine the camera position of the second camera.

A model of at least one part of the environment may be reconstructed according to the first and second images and the camera positions of the first and second cameras.

In one embodiment of reconstructing the model, correspondences between image features of the at least one part of the environment in the first and second images are determined. Then, a triangulation method can be used to determine the model from the image feature correspondences and the camera positions of the first camera and second camera, see for example Hartley, Richard, and Andrew Zisserman. Multiple view geometry in computer vision. Vol. 2. Cambridge, 2000.

A model of an object, as described above, at least describes depth information of at least part of the object. The model further may include one of the following attributes, but is not limited to, shape, symmetry, planarity, geometrical size, color, texture and density.

As the physical geometry of the at least one part of the environment captured in the first and second images could be known, a correct scale factor for the reconstructed model could be determined as taught, e.g., in Davison, Andrew J., et al. "MonoSLAM: Real-time single camera SLAM." Pattern Analysis and Machine Intelligence, IEEE Transactions on 29.6 (2007): 1052-1067. The reconstructed model can be represented as 3D vertices, polygonal faces and/or edges spanned by these vertices. Edges and faces of the model may also be represented as splines or NURBS surfaces.

The reconstructed model may be determined in the environment coordinate system. The reconstructed model may also be determined in an arbitrary coordinate system, such as its own coordinate system. In this case, the reconstructed model can be related to the environment coordinate system based on the position of the at least one part of the environment in the environment coordinate system.

According to an embodiment, a third camera of the mobile device may capture a third image. The third image includes a part of the environment, which is represented by at least part of the reconstructed model. The part of the environment does not need to include the at least one part of the environment captured by the first camera, or includes only a part thereof. Particularly, the part of the environment captured in the third image does not need to include the display device of the environment or any visual content displayed on the display device.

A camera position of the third camera relative to the model while the third image is captured may be determined according to at least part of the reconstructed model and at least part of the third image. For example, a SLAM method (see Davison, Andrew J., et al. "MonoSLAM: Real-time single camera SLAM." Pattern Analysis and Machine Intelligence, IEEE Transactions on 29.6 (2007): 1052-1067) could be employed for determining the camera position of the third camera.

In one example, the position of the third camera in the environment coordinate system while the third camera captures the third image may be used to determine the position associated with the mobile device in the environment coordinate system. The position associated with the mobile device may be the same as the position of the third camera in the environment coordinate system. The position associated with the mobile device in the environment coordinate system may have a displacement in space from the position of the third camera in the environment coordinate system.

The camera position of the third camera in the environment coordinate system can be determined from the camera position of the third camera relative to the model and a spatial relationship between the model and the environment coordinate system.

Furthermore, the model can further be used to initialize a vision based Simultaneous Localization and Mapping (SLAM) method, such as described in references [4,5,6], for tracking the camera(s) of the mobile device in the environment coordinate system and/or extending the reconstructed model by adding other reconstructed parts of the environment.

For example, a fourth image of at least one second part of the environment is captured by a fourth camera of the mobile device. The fourth image may further capture a part of the environment that is represented by at least part of the reconstructed model. Then, the reconstructed model could be extended to have the first part and second part of the environment based on the SLAM method. This may require to compute a camera pose of the fourth camera relative to the model while capturing the fourth image based on matching image positions of the part of the environment and the at least part of the reconstructed model of the part of the environment.

The position associated with the mobile device can be determined according to a camera position of a camera of the mobile device in the environment coordinate system. The camera position could be estimated according to at least part of the reconstructed model and at least one image captured by the camera based on the SLAM method. For this, the at least one image captures a part of the environment represented by the at least part of the reconstructed model. The position associated with the mobile device may be the same as the position of the camera while the camera captures the at least one image.

The determined position or the determined movement associated with the mobile device in the environment coordinate system can be provided to the environment to control the at least one function of the environment according to the position or the movement. The at least one function may be related to one or more sub-systems of the environment. Sub-systems of the environment could be, but are not limited to, a sound system, an ambient light system, and an air conditioning system.

The at least one function could control or configure one or more sub-systems of the environment according to the determined position associated with the mobile device in the environment coordinate system. For example, the position could specify a center position of an area in space where the ambient light system should illuminate or the air conditioning system should monitor temperature. A listening area could also be specified by the position such that the sound system would be controlled or adjusted for orientating it towards the specified listening area.

The mobile device may communicate with the environment directly or via a computer network. The mobile device may communicate with the environment indirectly via other devices, e.g. via a web service computer.

The computer network may be a telecommunications network that connects processing devices (e.g. computers) to allow communication and data exchange between systems, software applications, and users. The processing devices may be connected via cables, or wirelessly, or both via cables and wirelessly. For example, the computer network could be an Internet, intranet, local area network, or wide area network.

In one embodiment, the mobile device may comprise one camera. The first camera, the second camera, the third camera, and the fourth camera are the same camera.

In another embodiment, the mobile device may comprise at least two cameras. At least two of the first camera, the second camera, the third camera, and the fourth camera are different cameras.

In another embodiment, at least two of the first camera, the second camera, the third camera, and the fourth camera are the same camera.

Camera intrinsic parameters for the first camera, the second camera, the third camera, and/or the fourth camera may be provided or calibrated based on a camera calibration method. The camera intrinsic parameters may be used to determine camera positions or camera movements based on camera images.

In one embodiment, the system according to the invention could be electronically coupled with or be a part of the mobile device. It could be separate from the environment. The system may communicate with the environment via cable, wirelessly or via a computer network. The system could determine the position or the movement associated with the mobile device in the environment coordinate system and send the position or the movement to the environment for controlling the at least one function.

In a further embodiment, the system could receive environment information from the environment. The environment information may include at least one of the environment coordinate system, a visual appearance of a displayed visual content, a resolution of a display device used for the display, a position of the display device (i.e. the at least one part of the environment) in the environment coordinate system, a physical geometry of the display device (i.e. the at least one part of the environment), or their combinations.

In another embodiment, the system could be electronically coupled with or be a part of the environment and separate from the mobile device. The system may communicate with the mobile device via cable, wirelessly or via a computer network. The mobile device could send camera images to the system. The mobile device may further need to send camera intrinsic parameters (e.g. focal length and principal point) to the system. The camera intrinsic parameters may be used to determine camera positions based on camera images.

In another embodiment, the system could be separate from the mobile device and separate from the environment. The system may communicate with the mobile device and/or the environment via cable, wirelessly or via a computer network. The system could receive environment information from the environment and receive camera images and camera intrinsic parameters from the mobile device. Then, the system could determine the position or the movement associated with the mobile device in the environment coordinate system and send the position or movement to the environment or to one or more sub-systems of the environment related to the at least one function for controlling the at least one function.

According to another aspect, the invention is also related to a computer program product comprising software code sections which are adapted to perform a method according to the invention. Particularly, the computer program product is contained on a computer readable medium and is non-transitory. The software code sections may be loaded into a memory of one or more of the processing devices as described herein.

According to an embodiment, the method may be implemented as an application which runs on one or more processing devices of a mobile device, such as a mobile phone, and which communicates directly or indirectly with the environment.

According to another embodiment, the method may be implemented as an application which runs on one or more processing devices of the environment, and which communicates directly or indirectly with the mobile device and/or camera.

According to another embodiment, the method may be implemented as an application which runs on one or more processing devices of a computer, such as a mobile computer or a personal computer, communicating directly or indirectly with the mobile device and/or camera and with the environment.

DESCRIPTION OF THE DRAWINGS

Aspects and embodiments of the invention will now be described with respect to the drawings, in which.

Figure 1:
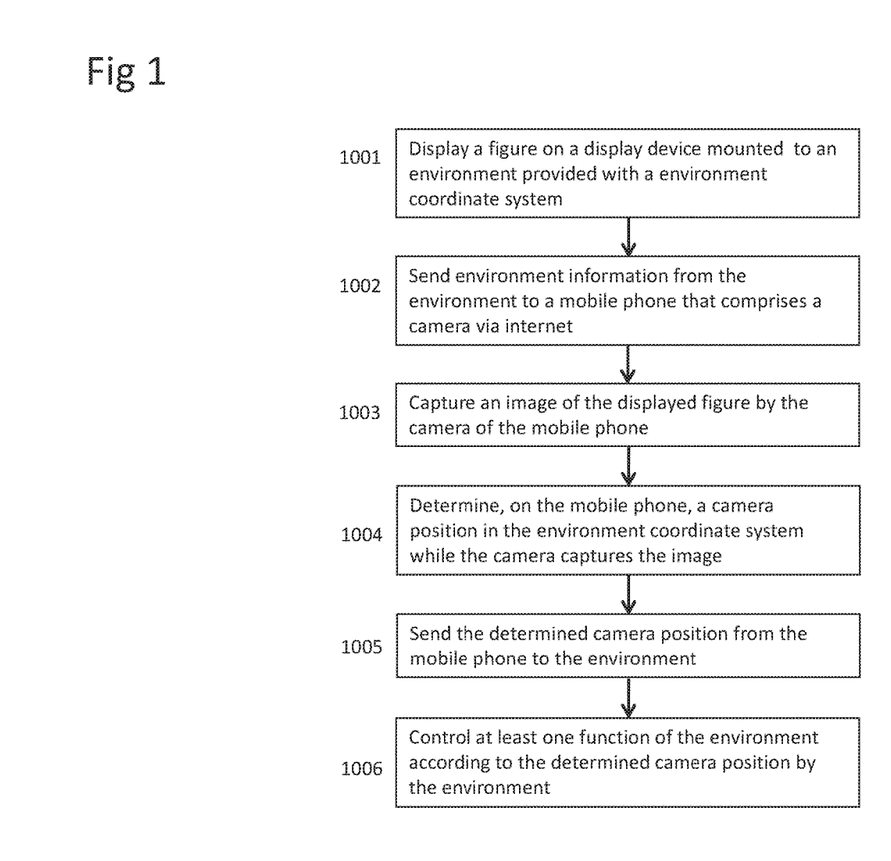
FIG. 1 shows a flowchart of an exemplary embodiment of the present invention.
Figure 2:
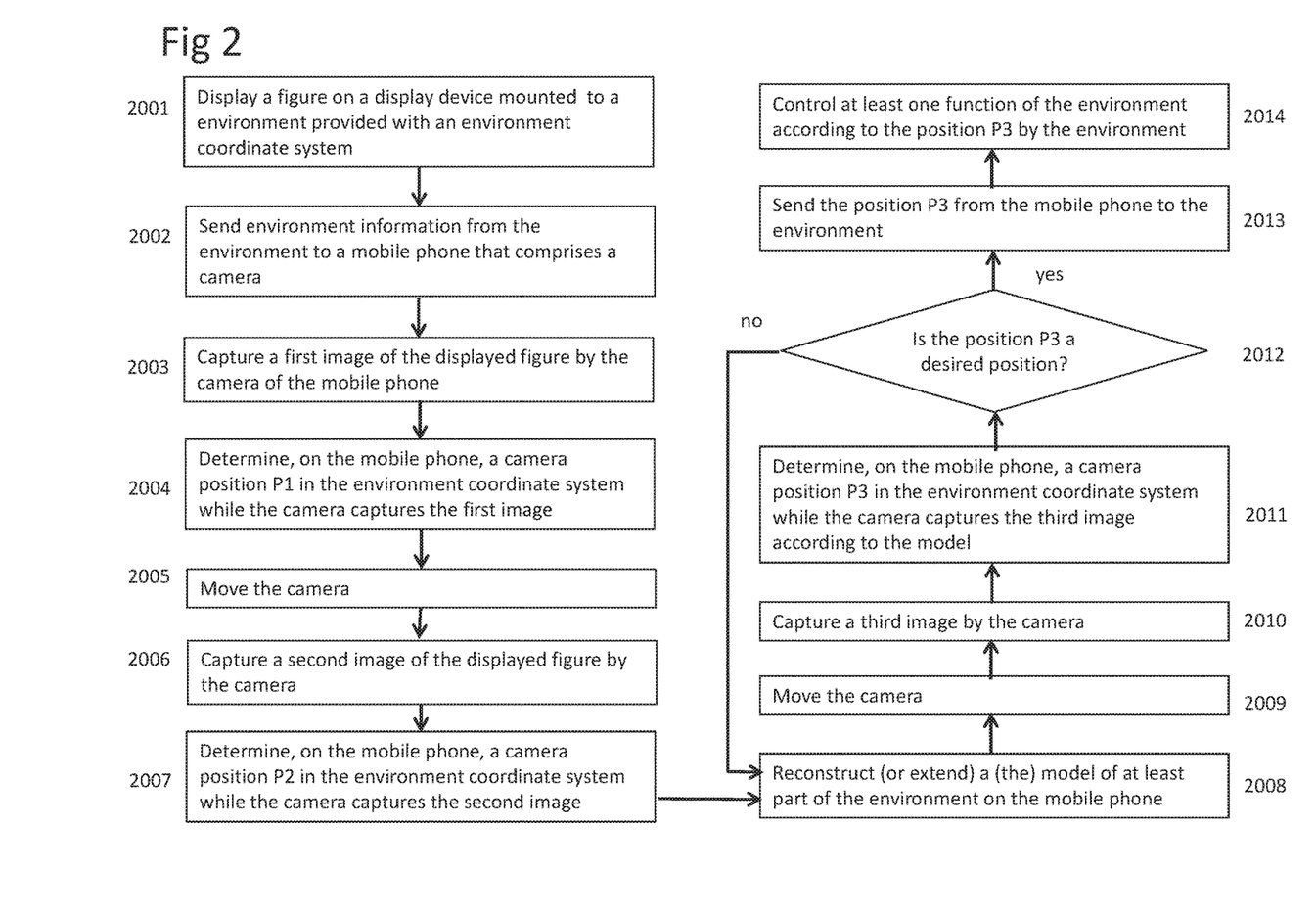
FIG. 2 shows a flowchart of another exemplary embodiment of the present invention.
Figure 3:
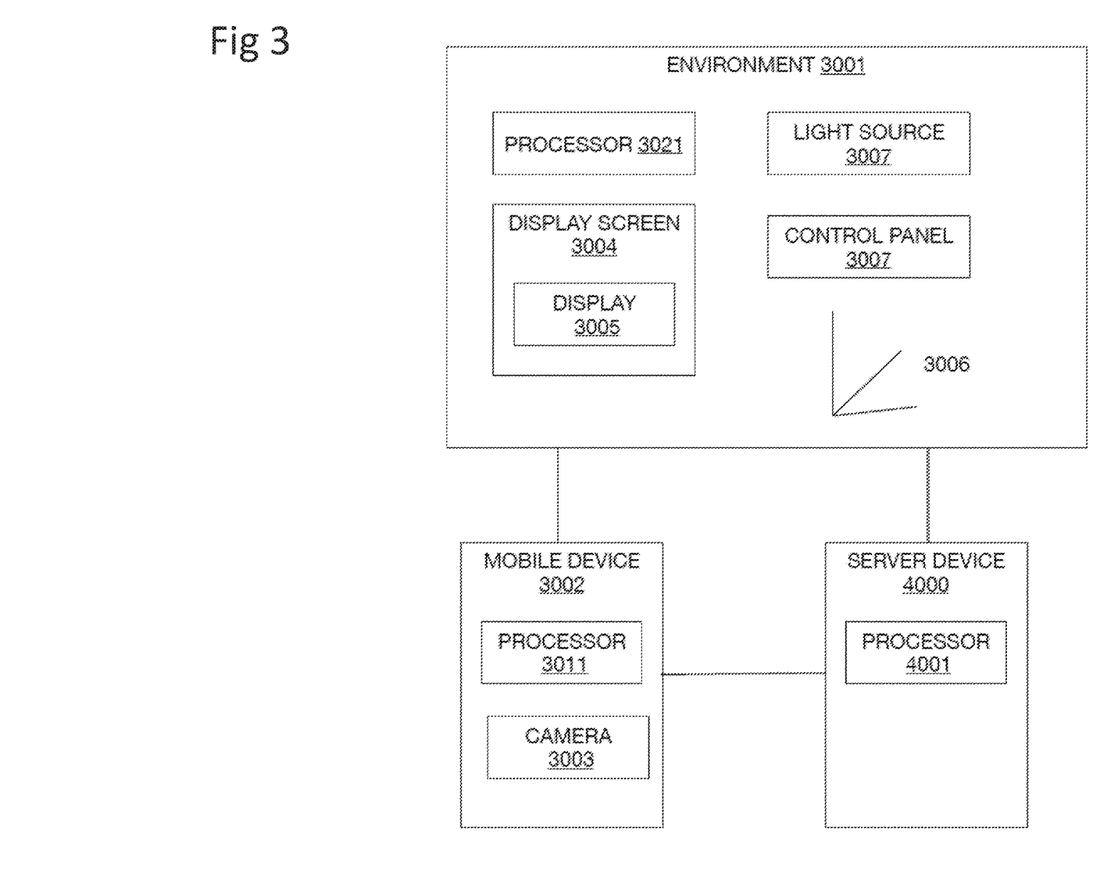
FIG. 3 shows an exemplary scene according to an embodiment of the present invention.

In the following, aspects and embodiments of the invention will be explained with reference to the exemplary embodiments as shown in FIGS. 1 to 3. The following embodiments are described with reference to using a mobile phone, but the invention may be applied in principle with any mobile device which is associated through a specified spatial relationship with a camera for capturing images.

DETAILED DESCRIPTION

FIG. 3 shows an exemplary scene of an environment, in which a part of the environment 3001 includes a front control panel 3009 and a light source 3007. A display device comprises a screen 3004 mounted to the front control panel 3009. A potential visual content displayed on the screen 3004 is a 2D map 3005, but may also be any other visual content. An environment coordinate system 3006 is associated to the environment 3001.

In the exemplary scene shown in FIG. 3, the mobile device as used herein is a mobile phone 3002 that comprises a camera 3003. Camera intrinsic parameters of the camera 3003 are provided to the mobile device.

In a potential use scenario, the environment 3001 sends environment information to the mobile phone 3002 wirelessly via a computer server. The environment information includes at least part of imagery information (i.e. visual appearance) of the displayed 2D map 3005, a resolution of the screen 3004, a position of the screen 3004 in the environment coordinate system 3006, and a shape and size of the screen 3004.

In another embodiment, the screen 3004 may show an iconic outline of the mobile phone 3002. The iconic outline has a known position in a display coordinate system of the screen 3004, and thus could also have a known position in the environment coordinate system 3006. If the camera 3003 has a known position relative to the mobile phone 3002, then the camera 3003 could have a known initial position in the environment coordinate system 3006 when the mobile phone 3002 is placed on the position indicated by the iconic outline on the screen 3004. This initial position of the camera 3003 in the environment coordinate system 3006 may be used for tracking the camera 3003 and/or reconstructing a part of the environment 3001. A position of the camera 3003 may be determined relative to its own initial position, i.e. determining a motion of the camera 3003, for example based on inertial sensors attached to the camera 3003 or based on corresponding image features between two images captured by the camera 3003. Thus, the camera 3003, and accordingly the mobile phone 3002 associated with the camera 3003, can be tracked in the environment coordinate system 3006.

The mobile device, here mobile phone 3002, has at least one or more processing devices, such as one or more microprocessors and associated circuitry, which are commonly used in the art and not shown in the Figures, since they are internal to the mobile phone 3002. An internal processing device is indicated with reference number 3011 in FIG. 3. Among other tasks as commonly used and applied in the art, with regard to the present invention the processing device 3011 is configured to communicate with the camera 3003 and to perform tasks and steps as described herein in connection with the invention, such as the steps as described with reference to FIGS. 1 and 2. In this example, the mobile phone 3002 may be held by a user. Camera intrinsic parameters of the camera 3003 are provided to the processing device 3011 or may be determined by a camera calibration procedure.

Moreover, the environment 3001 may comprise at least one or more processing devices, such as one or more microprocessors and associated circuitry, which are commonly used in the art and designated in FIG. 3 with reference number 3021. Among other tasks as commonly used and applied in the art, with regard to the present invention the processing device 3021 is configured to display the visual content 3005 on the screen 3004. The processing device 3021 is further applicable to perform tasks and steps as described herein in connection with the invention, such as the steps as described with reference to FIGS. 1 and 2. In one or more embodiments, the environment may be a system or collection of systems that include such components as a processor, circuitry, control panel, display screen and the like, such as a smart home system, a portable kiosk, a vehicle, a network of computer systems, and the like.

According to an embodiment, each of the processing devices 3011 and/or 3021, or in any combination with each other, is appropriate and may be configured to perform any of the steps according to the invention as described herein, such as to receive image information associated with images captured by a camera (such as camera 3003) directly from the camera or from another processing device, to determine a position associated with the mobile device in the environment coordinate system according to the received image information, and to provide position information indicative of the position associated with the mobile device in the environment coordinate system. For example, such position information may be provided to a control device of the environment via direct communication, or indirectly via another processing device (such as a server computer), to control at least one function of the environment according to the position.

These tasks and steps may also be performed by another one or more processing devices, such as processing device 4001, which is neither contained in the mobile phone 3002 nor in the environment 3001, but in another device, such as a server computer 4000, communicating with the mobile phone 3002 and the environment 3001, e.g. wirelessly over a computer network. Further, it is possible that all or some of the tasks and steps according to the invention as described herein may be shared or distributed between the processing devices 3011, 3021 and 4001.

The camera 3003 and the housing of the mobile phone 3002 have fixed positions relative to each other. A spatial relationship between the camera 3003 and any part of the mobile phone 3002 may be provided by the manufacturer of the mobile phone 3002 or may be calibrated as commonly known in the art.

Turning now to the process as described with reference to FIG. 1, in the exemplary embodiment of the invention as shown in FIG. 1, a display device mounted to the environment, which is provided with an environment coordinate system, displays a figure on its screen in step 1001, such as a visual content in the form of a 2D map 3005 as shown in FIG. 3. The environment sends environment information from the environment to the mobile phone that comprises a camera via Internet in step 1002. The camera of the mobile phone captures an image of the figure displayed on the display device in step 1003. In the exemplary scene shown in FIG. 3, the camera 3003 captures an image of the displayed 2D map 3005. The image may include only a part of the displayed 2D map 3005.

Step 1004 determines, in this embodiment on the mobile phone, a camera position in the environment coordinate system while the camera captures the image. In the exemplary scene shown in FIG. 3, a camera position of the camera 3003 in the environment coordinate system 3006 while the camera 3003 captures the image can be determined, which is performed on the processing device 3011 of mobile phone 3002 according to received image information associated with the captured image. The determination of the camera position could be based on matching the image captured by the camera 3003 and the imagery information of the 2D map 3005 received at the mobile phone 3002. From the determined camera position, the position associated with the mobile device 3002 in the environment coordinate system 3006 may be determined which may be used as an input for controlling at least one function of the environment. A known spatial relationship between the camera 3003 and any part of the mobile device 3002 may be used for this determination.

Step 1005 sends the determined camera position from the mobile phone to the environment. In the exemplary scene shown in FIG. 3, the camera position of the camera 3003 in the environment coordinate system 3006 is provided from the mobile phone 3002 to the environment 3001.

The environment then may control at least one function of the environment according to the received camera position in step 1006. In the exemplary scene shown in FIG. 3, the processing device 3021 of environment 3001 may control an illuminating direction of the light source 3007. The light source 3007 could be directed to illuminate the area 3008 along a direction defined by the camera position of the camera 3003.

FIG. 2 shows a flowchart of another exemplary embodiment. Step 2001 displays a figure on a display device mounted to an environment provided with an environment coordinate system. The environment sends environment information to a mobile phone that comprises a camera in step 2002. The camera of the mobile phone captures a first image of the displayed figure in step 2003. Step 2004 determines, on the mobile phone, a camera position P1 in the environment coordinate system while the camera captures the first image according to the first image and the displayed figure. In step 2005, the camera, i.e. the mobile phone, is moved to another position that is different from the position P1. The camera of the mobile phone captures a second image of the displayed figure in step 2006. Step 2007 determines, on the mobile phone, a camera position P2 in the environment coordinate system while the camera captures the second image according to image information of the second image and the displayed figure. Step 2008 reconstructs a model of at least part of the environment on the mobile phone based on the image information of the first image and the second image and the camera positions P1 and P2. This could be realized using a triangulation method.

In step 2009, the camera is moved. The camera captures a third image in step 2010. Step 2011 determines, on the mobile phone, a camera position P3 in the environment coordinate system while the camera captures the third image according to the model. This could be implemented based on a SLAM method. In step 2012, it is determined if the position P3 is a desired position. The desired position indicates that a user wants to configure or control a function of the environment according to the desired position. For example, the user may read a book. The desired position may indicate a center position of an area around the book where an ambient light system of the environment should illuminate. If it is not a desired position, then go to step 2008, and extend the model according to the third image using, e.g., the SLAM method. On the other hand, if it is the desired position, then send the position P3 from the mobile phone to the environment (step 2013). The environment is then capable to control at least one function of the environment according to the received position P3 (step 2014).

A method for providing position information for controlling at least one function of a vehicle provided with a vehicle coordinate system may include receiving image information associated with at least one image of at least one part of the vehicle captured by a camera of a mobile device, the mobile device being separate from the vehicle, determining a position associated with the mobile device in the vehicle coordinate system according to the image information associated with the at least one image, and providing position information indicative of the position associated with the mobile device in the vehicle coordinate system to control at least one function of the vehicle according to the position. The method may also include providing or receiving a position of the at least one part of the vehicle in the vehicle coordinate system. The at least one part of the vehicle comprises a visual content displayed on a display device mounted to the vehicle. Determining the position associated with the mobile device in the vehicle coordinate system may include determining a camera position of the camera relative to the at least one part of the vehicle when capturing the at least one image according to the image information associated with the at least one image, and determining the position associated with the mobile device in the vehicle coordinate system according to the camera position and the position of the at least one part of the vehicle in the vehicle coordinate system. The at least one image is a first image and the camera may be a first camera, and determining the position associated with the mobile device in the vehicle coordinate system may include receiving image information associated with a second image of the at least one part of the vehicle captured by a second camera of the mobile device, and reconstructing a model of the at least one part of the vehicle according to the image information associated with the first and second images.

The method may also include receiving image information associated with a third image captured by a third camera of the mobile device, wherein the third image captures at least a part of the vehicle represented by at least part of the reconstructed model, determining a camera position of the third camera relative to the reconstructed model when capturing the third image according to the at least part of the reconstructed model and image information associated with the third image, and determining the position associated with the mobile device in the vehicle coordinate system according to the camera position of the third camera. The method may also include determining a camera position of the first camera relative to the at least one part of the vehicle when capturing the first image according to at least part of the image information associated with the first image, and determining a camera position of the second camera relative to the at least one part of the vehicle when capturing the second image according to at least part of the image information associated with the second image. The at least one part of the vehicle may be a first part of the vehicle and the method may also include receiving image information associated with a fourth image captured by a fourth camera of the mobile device, wherein the fourth image captures at least part of the first part of the vehicle and at least a second part of the vehicle, and extending the reconstructed model to include the first part of the vehicle and the second part of the vehicle. The reconstructed model may at least describes depth information of at least part of the vehicle. At least two of the first camera, the second camera, the third camera, and the fourth camera may be the same camera. At least two of the first camera, the second camera, the third camera, and the fourth camera may be different cameras. The at least one function may be a function which is related to at least one of a sound system of the vehicle, an ambient light system of the vehicle, and an air conditioning system of the vehicle, and which is controlled according to the position.

A method for providing movement information for controlling at least one function of a vehicle provided with a vehicle coordinate system may include receiving image information associated with at least two images captured by at least one camera of a mobile device, the mobile device being separate from the vehicle, each of the at least two images capturing at least one part of the vehicle, determining a movement associated with the mobile device relative to the vehicle coordinate system according to the image information associated with the at least two images, and providing movement information indicative of the movement associated with the mobile device relative to the vehicle coordinate system to control at least one function of the vehicle according to the movement. The movement associated with the mobile device relative to the vehicle coordinate system may be determined according to at least two positions associated with the mobile device in the vehicle coordinate system. The movement associated with the mobile device relative to the vehicle coordinate system may be determined according to at least two camera positions of the at least one camera while capturing the at least two images. The movement associated with the mobile device relative to the vehicle coordinate system may be determined according to image positions of the at least one part of the vehicle captured in the each of the at least two images. The at least one function may be a function controlled based on a determined movement associated with the mobile device, particularly a function which is related to at least one of a sound system, a lighting system and an air conditioning of the vehicle controlled according to the movement of the mobile device.

A system for providing position information for controlling at least one function of a vehicle provided with a vehicle coordinate system may include a first processing device configured to receive image information associated with at least one image of at least one part of the vehicle captured by a camera of a mobile device, the mobile device being separate from the vehicle, the first processing device configured to determine a position associated with the mobile device in the vehicle coordinate system according to the image information associated with the at least one image, and a second processing device configured to provide position information indicative of the position associated with the mobile device in the vehicle coordinate system to control at least one function of the vehicle according to the position.

A system for providing movement information for controlling at least one function of a vehicle provided with a vehicle coordinate system, may include a first processing device configured to receive image information associated with at least two images captured by at least one camera of a mobile device, the mobile device being separate from the vehicle, and each of the at least two images capturing at least one part of the vehicle, the first processing device configured to determine a movement associated with the mobile device relative to the vehicle coordinate system according to the image information associated with the at least two images, and a second processing device configured to provide movement information indicative of the movement associated with the mobile device relative to the vehicle coordinate system to control at least one function of the vehicle according to the movement. The first processing device and the second processing device may be the same processing device. At least one of the first and second processing devices may be comprised in the mobile device. At least one of the first and second processing devices may be comprised in the vehicle. At least one of the first and second processing devices may be comprised in a computer device which communicates with the mobile device and the vehicle. The mobile device may be a hand held device, particularly a mobile phone, a tablet computer or a mobile computer.

A computer program product may include software code sections which are adapted to perform a method as described above when loaded into the internal memory of a processing device.

The steps and system components as described above related to the first aspect of a method and system for providing position information for controlling at least one function of an environment may analogously be applied with same or similar components in connection with the second aspect of a method and system for providing movement information for controlling at least one function of an environment, with the modification of providing image information associated with at least two images captured by at least one camera of a mobile device, and the following steps considering this image information as described above. Further, the components, such as mobile device, camera, and/or processing devices, as described above may also be configured to perform the method of the second aspect for providing movement information for controlling at least one function of an environment.

Throughout this document it is described that image information associated with an image is provided or received. It is known to the skilled person that this may include providing or receiving any processed or non-processed information (version) of an image, part of an image and/or features of an image which allows for position or pose estimation. The invention does not require providing or receiving any raw image data. Processing thereby includes any one of compression (e.g. JPEG, PNG, ZIP), encryption (e.g. RSA encryption, Schnorr signature, El-Gamal encryption, PGP), conversion to another color space or grayscale, cropping or scaling the image or conversion into a sparse representation based on feature descriptors, extraction, and their combinations. All these image processing methods can optionally be performed and are covered by the terminology of image information of or associated with an image.

The invention claimed is:

1. A method for providing position information for controlling at least one function of a vehicle provided with a vehicle coordinate, the method comprising:
    receiving image information associated with at least one image of at least one part of a vehicle captured by a camera of a mobile device, the mobile device being separate from the vehicle;
    determining a position of the mobile device in the vehicle coordinate system according to the image information associated with the at least one image; and
    providing position information indicative of the position of the mobile device in the vehicle coordinate system to control at least one function of the vehicle according to the position.

2. The method according to claim 1, further comprising obtaining a position of the at least one part of the vehicle in the vehicle coordinate system.

3. The method according to claim 2, wherein the at least one part of the vehicle comprises a visual content displayed on a display device mounted to the vehicle.

4. The method according to claim 2, wherein determining the position of the mobile device in the vehicle coordinate system comprises:
    determining a camera position of the camera relative to the at least one part of the vehicle when capturing the at least one image according to the image information associated with the at least one image; and
    determining the position of the mobile device in the vehicle coordinate system according to the camera position and the position of the at least one part of the vehicle in the vehicle coordinate system.

5. The method according to claim 1, wherein the at least one function is a function which is related to at least one selected from a group consisting of a sound system of the vehicle, an ambient light system of the vehicle, and an air conditioning system of the vehicle, and which is controlled according to the position.

6. A non-transitory computer readable medium comprising computer readable code for providing position information for controlling at least one function of a vehicle provided with a vehicle coordinate system, the computer readable code executable by one or more processors to:
    receive image information associated with at least one image of at least one part of a vehicle captured by a camera of a mobile device, the mobile device being separate from the vehicle;

determine a position of the mobile device in the vehicle coordinate system according to the image information the at least one image; and provide position information indicative of the position of the mobile device in the vehicle coordinate system to control at least one function of the vehicle according to the position.

7. The non-transitory computer readable medium of claim 6, further comprising computer code executable by one or more processors to obtain a position of the at least one part of the vehicle in the vehicle coordinate system.

8. The non-transitory computer readable medium of claim 7, wherein the at least one part of the vehicle comprises a visual content displayed on a display device mounted to the vehicle.

9. The non-transitory computer readable medium of claim 7, wherein the computer readable code to determine the position of the mobile device in the vehicle coordinate system comprises computer code executable by one or more processors to:

determine a camera position of the camera relative to the at least one part of the vehicle when capturing the at least one image according to the image information associated with the at least one image; and determine the position of the mobile device in the vehicle coordinate system according to the camera position and the position of the at least one part of the vehicle in the vehicle coordinate system.

10. A system for providing position information for controlling at least one function of a vehicle provided with a vehicle coordinate system, comprising:

one or more processors;

a storage device comprising computer readable code executable by the one or more processors to:

receive image information associated with at least one image of at least one part of a vehicle captured by a camera of a mobile device, the mobile device being separate from the vehicle;

determine a position of the mobile device in the vehicle coordinate system according to the image information associated with the at least one image; and provide position information indicative of the position of the mobile device in the vehicle coordinate system to control at least one function of the vehicle according to the position.

11. The system of claim 10, further comprising computer code executable by one or more processors to obtain a position of the at least one part of the vehicle in the vehicle coordinate system.

12. The system of claim 11, wherein the at least one part of the vehicle comprises a visual content displayed on a display device mounted to the vehicle.

13. The system of claim 11, wherein the computer readable code to determine the position of the mobile device in the vehicle coordinate system comprises computer code executable by one or more processors to:

determine a camera position of the camera relative to the at least one part of the vehicle when capturing the at least one image according to the image information associated with the at least one image; and determine the position of the mobile device in the vehicle coordinate system according to the camera position and the position of the at least one part of the vehicle in the vehicle coordinate system.

* * * * *

UNITED STATES PATENT AND TRADEMARK OFFICE
CERTIFICATE OF CORRECTION

PATENT NO. : 10,268,216 B2
APPLICATION NO. : 15/093607
DATED : April 23, 2019
INVENTOR(S) : Thomas Alt et al.

Page 1 of 1

It is certified that error appears in the above-identified patent and that said Letters Patent is hereby corrected as shown below:

In the Claims

Claim 6, Column 17, Line 3, should read:
-- associated with the at least one image; and --

Signed and Sealed this
Fourth Day of June, 2019

Andrei Iancu
*Director of the United States Patent and Trademark Office*